US009381890B2

(12) United States Patent
Lee et al.

(10) Patent No.: US 9,381,890 B2
(45) Date of Patent: Jul. 5, 2016

(54) METHOD AND APPARATUS FOR BIOMETRIC VEHICLE ACTIVATION

(71) Applicant: Ford Global Technologies, LLC, Dearborn, MI (US)

(72) Inventors: Benjamin Lee, Dearborn, MI (US); Scott Cutler, Ann Arbor, MI (US); Venkatesh Krishnan, Canton, MI (US); Pete Christ Korovesis, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 103 days.

(21) Appl. No.: 14/172,356

(22) Filed: Feb. 4, 2014

(65) Prior Publication Data

US 2015/0217726 A1 Aug. 6, 2015

(51) Int. Cl.
*G06K 9/00* (2006.01)
*B60R 25/25* (2013.01)
*B60K 28/02* (2006.01)

(52) U.S. Cl.
CPC ............... *B60R 25/252* (2013.01); *B60K 28/02* (2013.01); *G06K 9/00087* (2013.01)

(58) Field of Classification Search
CPC ....................................................... G06K 9/00
See application file for complete search history.

(56) References Cited

U.S. PATENT DOCUMENTS

| | | | | |
|---|---|---|---|---|
| 6,078,265 A * | 6/2000 | Bonder | .............. | G07C 9/00563 340/5.23 |
| 6,100,811 A * | 8/2000 | Hsu | .................... | B60H 1/00642 340/426.36 |
| 6,140,939 A * | 10/2000 | Flick | ...................... | B60R 25/04 340/12.28 |
| 6,271,745 B1 * | 8/2001 | Anzai | ................ | G07C 9/00563 340/5.23 |
| 6,373,148 B1 * | 4/2002 | Daiss | ..................... | B60K 28/02 307/10.1 |
| 6,614,920 B2 * | 9/2003 | Floyd | .................... | B60R 25/021 340/5.53 |
| 6,727,800 B1 * | 4/2004 | Dutu | ................. | B60R 25/02102 123/179.1 |
| 6,810,309 B2 * | 10/2004 | Sadler | ..................... | B60R 25/04 701/1 |
| 6,924,729 B1 * | 8/2005 | Aschauer | ........... | G07C 9/00182 307/10.1 |
| 7,141,889 B2 * | 11/2006 | Takezaki | ................. | B60R 25/04 180/287 |
| 8,892,272 B1 * | 11/2014 | Wooding | .............. | B60R 25/252 340/5.52 |
| 8,937,528 B2 * | 1/2015 | Protopapas | ............. | B60R 25/25 340/5.52 |
| 8,938,224 B2 * | 1/2015 | Elliott | .................... | B60R 25/24 340/905 |

(Continued)

FOREIGN PATENT DOCUMENTS

WO 2005028237 A1 3/2005

*Primary Examiner* — Jonathan M Dager (74) *Attorney, Agent, or Firm* — Jennifer M. Stec; Brooks Kushman P.C.

(57) ABSTRACT

A system includes a processor configured to detect push-to-start (PTS) button engagement. The processor is also configured to scan a finger positioned on a vehicle fingerprint scanner for a fingerprint. The processor is further configured to verify that the fingerprint corresponds to an authorized driver and engage a vehicle ignition when the fingerprint corresponds to an authorized driver.

19 Claims, 4 Drawing Sheets

(56) References Cited

U.S. PATENT DOCUMENTS

| | | | |
|---|---|---|---|
| 2002/0034321 A1* | 3/2002 | Saito et al. | 382/124 |
| 2002/0048391 A1* | 4/2002 | Kim | B60R 25/04 382/124 |
| 2002/0059523 A1* | 5/2002 | Bacchiaz | B60R 25/252 726/2 |
| 2002/0097145 A1* | 7/2002 | Tumey | B60R 25/04 340/426.28 |
| 2003/0048000 A1* | 3/2003 | Harter | B60R 25/04 307/10.6 |
| 2004/0232229 A1* | 11/2004 | Gotfried | B60R 25/00 235/382 |
| 2004/0233046 A1* | 11/2004 | Gotfried | B60R 25/04 340/426.1 |
| 2005/0237150 A1* | 10/2005 | Sun | G07C 9/00182 340/5.52 |
| 2006/0186987 A1* | 8/2006 | Wilkins | B60R 25/252 340/5.53 |
| 2006/0202797 A1* | 9/2006 | Theis | B60R 25/243 340/5.52 |
| 2006/0294393 A1* | 12/2006 | McCall | H04L 9/32 713/186 |
| 2007/0247279 A1* | 10/2007 | Safonov | G07C 9/00158 340/5.53 |
| 2008/0030301 A1* | 2/2008 | Terao | B60R 25/04 340/5.53 |
| 2009/0040306 A1* | 2/2009 | Foote | B60Q 1/2665 348/148 |
| 2009/0079539 A1* | 3/2009 | Johnson | G06K 9/00885 340/5.83 |
| 2010/0060412 A1* | 3/2010 | Johnson | B60R 25/04 340/5.53 |
| 2010/0108425 A1* | 5/2010 | Crespo | A61B 5/082 180/272 |
| 2010/0235026 A1* | 9/2010 | Shimizu | B60R 25/241 701/22 |
| 2010/0246902 A1* | 9/2010 | Rowe | G06K 9/00033 382/115 |
| 2011/0105097 A1* | 5/2011 | Tadayon | H04M 3/53 455/418 |
| 2011/0215901 A1* | 9/2011 | Van Wiemeersch | B60R 25/04 340/5.54 |
| 2012/0161927 A1* | 6/2012 | Pierfelice | H04L 63/10 340/5.83 |
| 2013/0096733 A1* | 4/2013 | Manotas, Jr. | F02N 11/0807 701/2 |
| 2014/0002237 A1* | 1/2014 | Infante | B60R 25/252 340/5.32 |
| 2014/0114539 A1* | 4/2014 | Ando | F02D 35/00 701/51 |
| 2014/0156149 A1* | 6/2014 | Feit | B60R 25/252 701/49 |
| 2014/0222298 A1* | 8/2014 | Gurin | B60W 50/085 701/49 |
| 2014/0240086 A1* | 8/2014 | Van Wiemeersch | B60R 25/25 340/5.51 |
| 2014/0282931 A1* | 9/2014 | Protopapas | G06F 21/31 726/5 |
| 2014/0329513 A1* | 11/2014 | Jacob | B60K 28/00 455/418 |
| 2015/0025705 A1* | 1/2015 | Burger | B60R 16/037 701/1 |
| 2015/0102898 A1* | 4/2015 | Huennekens | G07C 9/00111 340/5.6 |

* cited by examiner

METHOD AND APPARATUS FOR BIOMETRIC VEHICLE ACTIVATION

TECHNICAL FIELD

The illustrative embodiments generally relate to a method and apparatus for biometric vehicle activation.

BACKGROUND

Many vehicles come equipped with push-to-start buttons, which allow vehicle ignition upon a press. These vehicles also often come with customizable key fobs, so that the combination of a fob and an ignition will cause the vehicle to revert to particular settings for the user associated with a given fob. Of course, fobs can easily be mixed up in a household, and the number of customizable fobs is limited by the physical number of fobs, requiring additional user expense if more than the initial number of fobs is desired, for an increased number of drivers, for example.

U.S. 2013/0096733 generally relates to an electronic ignition control system that includes a keyfob having a biometric sensor that senses an identifying biological characteristic of the user. The keyfob also has a transmitter that transmits an air-borne signal dependent upon the identifying biological characteristic. A vehicle includes a motor and an ignition that starts the motor. The ignition has an unlocked state in which the user can cause the ignition to start the motor by actuating a start mechanism. The ignition also has a locked state in which actuation of the start mechanism by the user does not cause the ignition to start the motor. The vehicle also has a receiver that receives the air-borne signal from the transmitter. The vehicle further has a controller in communication with each of the ignition and the receiver. The controller switches the ignition from the locked state to the unlocked state dependent upon the air-borne signal received by the receiver.

U.S. 2010/0235026 generally relates to a travel mode setting device for a hybrid car capable of ensuring the security against car theft and convenience when the car is lent to the third party. The hybrid car has travel drive sources and selectively uses one of them and can travel in one of travel modes. Authenticating means separately authenticate the car user and creates authentication results. Limiting means limits the travel modes to the usable travel modes according to the results of the authentication by the authenticating means.

SUMMARY

In a first illustrative embodiment, a system includes a processor configured to detect push-to-start (PTS) button engagement. The processor is also configured to scan a finger positioned on a vehicle fingerprint scanner for a fingerprint. The processor is further configured to verify that the fingerprint corresponds to an authorized driver and engage a vehicle ignition when the fingerprint corresponds to an authorized driver.

In a second illustrative embodiment, a system includes a processor configured to receive an add-new-driver instruction. The processor is also configured to receive an authorization format instruction corresponding to an authorization format for authorizing new driver addition. The processor is further configured to receive input corresponding to the authorization format and validate the input. Also, the processor is configured to scan a finger positioned on a vehicle fingerprint scanner for a new driver fingerprint, following input validation. The processor is additionally configured to add the new driver, including saving the new driver fingerprint in a driver profile corresponding to the new driver.

In a third illustrative embodiment, a system includes a processor configured to scan finger positioned over a vehicle fingerprint scanner upon depression of a push-to-start (PTS) button to obtain a fingerprint scan. The processor is further configured to compare the fingerprint scan to authorized driver fingerprints saved in the vehicle. Also, the processor is configured to engage a vehicle ignition if the fingerprint scan matches an authorized driver fingerprint saved in the vehicle. The processor is additionally configured to provide a secondary vehicle ignition engagement option if the fingerprint scan does not match an authorized driver fingerprint.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
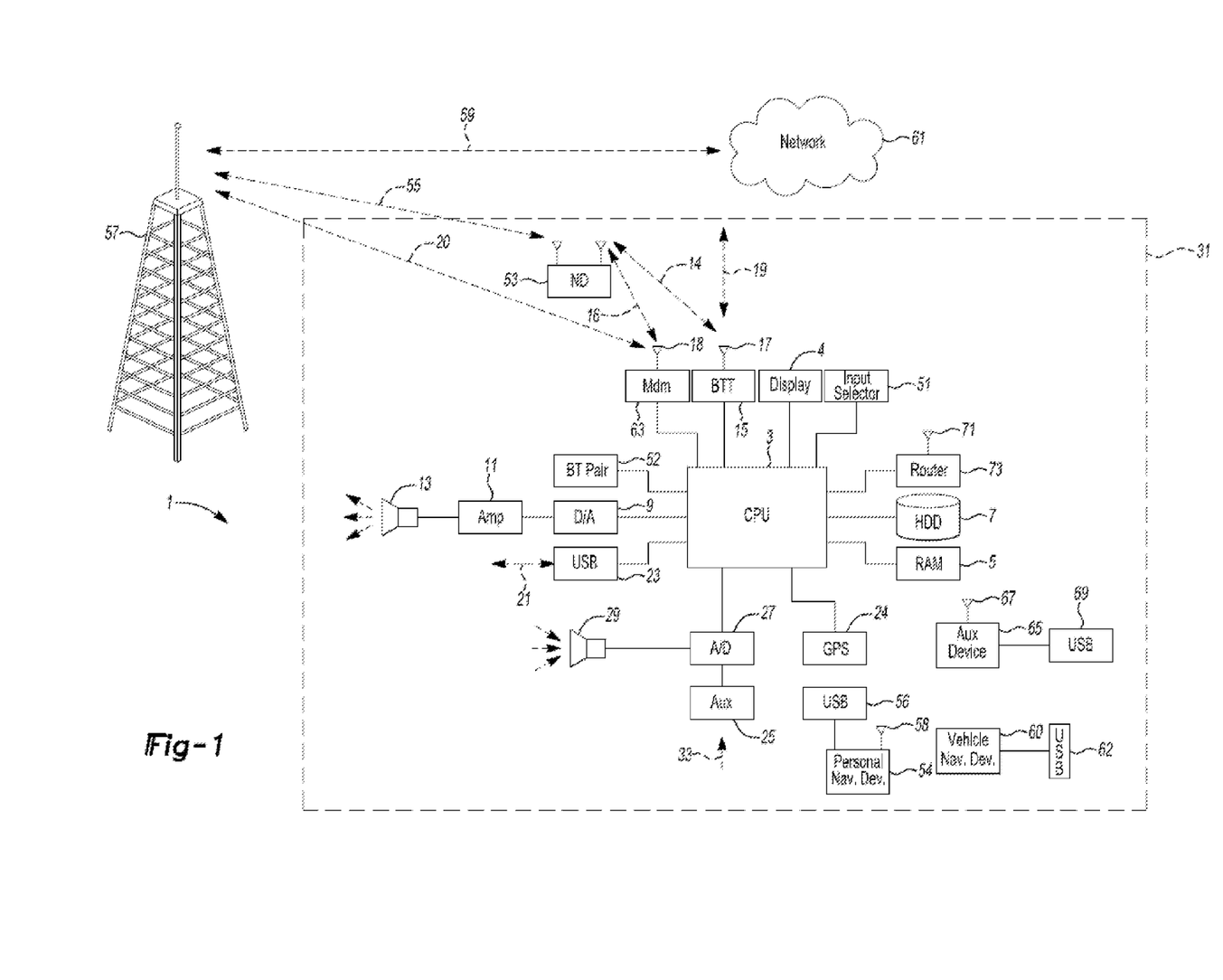
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a universal serial bus (USB) input 23, a global positioning system (GPS) input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a controller area network (CAN) bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, personal digital assistant (PDA), or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the central processing unit (CPU) is instructed that the onboard BLUETOOTH transceiver will be paired with a BLUETOOTH transceiver in a nomadic device.

Data may be communicated between CPU 3 and network 61 utilizing, for example, a data-plan, data over voice, or dual-tone multi-frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domain Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Push-to-start (PTS) systems have added a level of convenience to vehicle ignition. By possessing a fob that sends a radio signal to a vehicle transceiver when in close proximity, a driver merely needs to press a button to start a vehicle. While convenient, the fact that the driver interacts with the fob less frequently than a key increases the likelihood that the fob will be left in a vehicle or even in an article of clothing.

Further, while key fobs allow for customization of vehicle settings for a particular driver, adding more drivers than fobs currently possessed requires the purchase of additional fobs. Each fob can be customized to a given driver, but the fobs can also carry significant cost. And, as the fobs all tend to look alike, confusion between fobs in a home is quite possible. Further, if multiple fobs are present in a vehicle, it may be unclear which fob corresponds to an actual driver.

The illustrative embodiments propose a biometric start and identification system that allows the addition of a near limitless number of drivers to a vehicle, as well as providing each driver with a customized set of vehicle settings if desired. Since a driver will never be without his or her own fingerprint, there is no concern about loss of the identifying item (fingerprint) or confusion between fobs. Additionally, since the driver will be the person starting the vehicle, there will be no confusion about which settings to employ, as may have been the case in the multiple-fob-in-vehicle situation.

In addition, the driver can now enter the vehicle (through keyless entry, for example) and begin an ignition process without having to possess a physical item separate from a fingerprint. This can lead to an increased level of convenience. And there is no concern about the driver leaving the ignition catalyst in the vehicle, as the fingerprint will leave the vehicle with the driver.

In at least one illustrative example, a master driver is set at time of vehicle purchase. This driver is authorized to approve other drivers for addition to the vehicle system, and can be changed to a new driver at a later time if desired. A code may also be provided, so that a new driver can be added when a master driver is not present. Unauthorized drivers may also be given limited vehicle functionality, so that, for example, if the vehicle is in valet mode, a valet can access the vehicle for a limited time/distance and with limited functionality.

In the proposed illustrative embodiments, a fingerprint scanner is incorporated into the vehicle for driver identification. In at least one embodiment, the scanner is provided as part of the PTS button itself. Thus, with a single press, scanning is performed, the driver is verified and the ignition can be started. Driver-specific vehicle settings can also then be applied.

Figure 2:
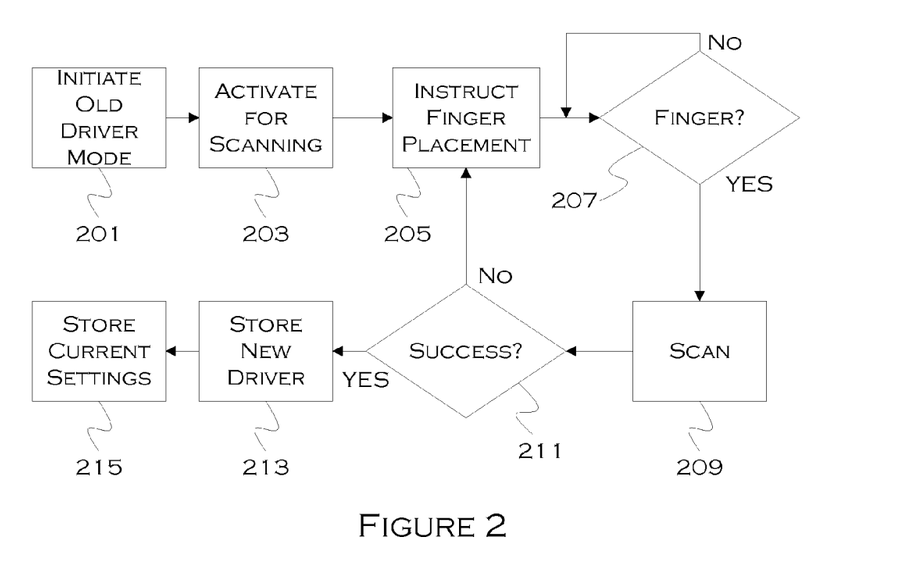
FIG. 2 shows an illustrative example of a driver registration process.

FIG. 2 shows an illustrative example of a driver registration process. In this illustrative example, an add driver mode is activated at the vehicle 201. This activation will be described in greater detail with respect to FIG. 4. Once activated, the process will activate the fingerprint reader (provided in the vehicle, for example, as part of the PTS button or at another location) for scanning a new fingerprint 203. The process instructs the new user to place an identifying finger (typically an index finger) on the scanner 205. Once the finger is placed 207, the process will attempt to scan the finger 209. The process of scanning can be repeated for a single driver for all fingers, such that if there is an issue with a finger, like a paper cut, an alternate finger can be used.

If the scan is not successful 211, the process can repeat the placement and scanning steps. Scans may be unsuccessful due to a variety of factors, and if the process detects a likely error, the repeat of the scan process could include useful advice as to how to achieve a high likelihood of scan recognition. Once the scan has been successfully performed, the process can store a record related to the new driver 213. Driver information can be input via a display interface, and driver seat, radio, climate, vehicle parameters, etc. settings can be stored, both locally and in the cloud 215. Parameters/limits may be set on a per-driver basis as well, such as limiting vehicle interfaces and speeds for teenagers identified by their fingerprints. In at least one embodiment, the driver's fingerprint can be used to identify the driver in any appropriately equipped vehicle, so that settings from another vehicle can be imported to the new vehicle from the cloud.

Figure 3:
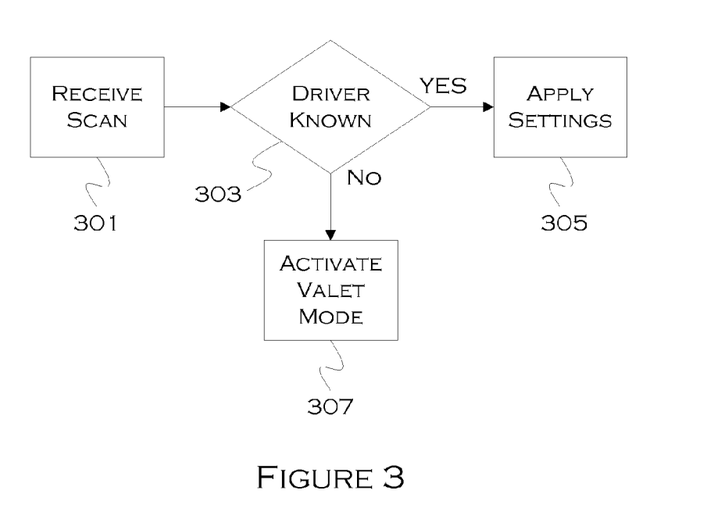
FIG. 3 shows an illustrative example of a vehicle ignition process.

FIG. 3 shows an illustrative example of a vehicle ignition process. In this example, the driver engages a PTS button equipped with a fingerprint scanner. The system receives a scan of the driver's fingerprint 301 and determines if the driver is known (to the vehicle and/or on the cloud). If the driver is unknown, a valet mode may be engaged 307. This mode may allow limited vehicle interoperability and may also require pre-approval from an authorized driver. In another example, the process may simply reject the start request altogether. If the driver is recognized and approved for vehicle use 303, the process may apply any appropriate settings 305 and engage a vehicle ignition.

Figure 4:
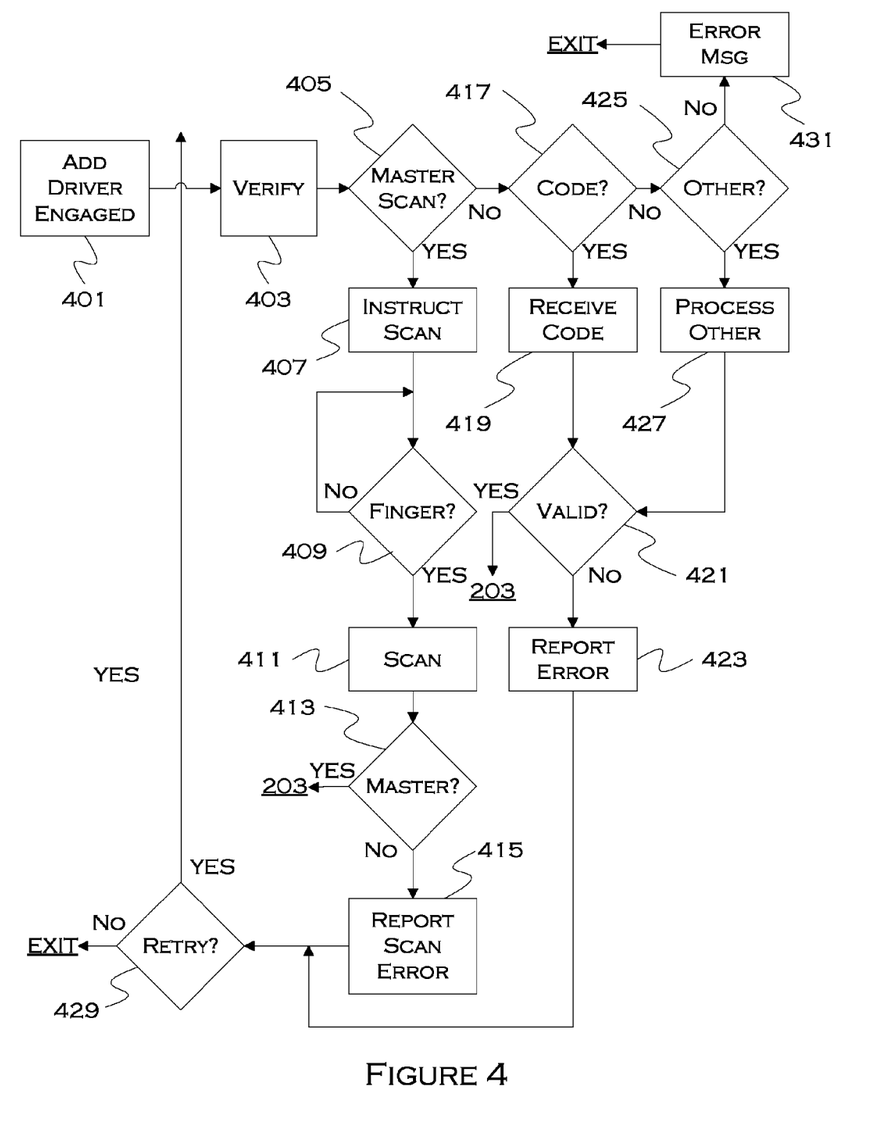
FIG. 4 shows a further example of an add driver registration process.

FIG. 4 shows a further example of an add driver registration process. In this illustrative example, an add-driver sequence will be initiated for the purpose of adding a new driver to a vehicle. A similar process can be used to authorize removal of a driver. Removal of a driver may require, for example, master authorization as shown in this process, and then a list may be presented on an interface from which a driver can be selected for removal.

In this example, the user first engages an "add driver" feature to initiate the process 401. Since the process is not the normal process of starting up the vehicle, the system may verify that a driver is, in fact, to be added. The verification may also indicate, for example, that a master driver should be present or that an add-driver key code should be possessed.

If the user wishes to add a driver via a master-driver scan 403, the process will instruct the master-driver to input a scan via the PTS scanner 407. Until a finger is present 409, the process may wait to scan. Once a finger is present (presumably the master-driver's identification finger), the process will scan the finger 411 for verification of master-driver status.

If the scan corresponds to the master driver 413, the process can continue with new user addition, as shown in example in FIG. 2. Otherwise, the process may report a scan error 415. The error could relate, for example, to a master driver not being present, or, for example, to a mis-scan or wrong finger. If the user wishes to retry the process 429, the process can loop back to providing input options.

If the user is not using a master-driver scan, or if the master-driver scan is not working for some reason, an add-user code could be utilized 417. This code could be generated by a master-driver, provided by a dealership, or obtained from a website, for example. The code could be alpha-numeric in nature, and could be input via a vehicle interface, for example.

In one instance, the code is generated at the vehicle by a master driver. At some point in time, prior to the new user addition, the master driver can request a code. The code could be limited in uses or in duration, or could last indefinitely. The vehicle can provide the code to the master driver for relay to the new driver, and then the new driver can use the code to add themselves to the authorized drivers, assuming that any qualifiers associated with the code, if any, are met.

In another example, a dealer may provide a master code or a number of limited use codes, that can be used to add additional drivers to a vehicle. The vehicle can also be provided with these codes so that the master driver does not need to interact with the vehicle for code implementation.

In yet another example, a website or other provider, related, for example, to an original equipment manufacturer (OEM) could provide a code for use. The code could have similar restrictions to other codes. When a connection to the internet or an OEM server is established by the vehicle (through use of a connected phone, for example), the codes can be uploaded to the vehicle for validation purposes.

If the code is to be used 417, the process will receive the code from the driver 419 and check if the code matches a currently valid code. If the code is valid, the new driver may be added. If the code is invalid, the process may report an error 423 and provide an option to retry the registration process.

If no code is to be input, any other suitable verification process may also be implemented 425. This could include, but is not limited to, a button sequence within the vehicle (e.g., push radio button 1 three times, depress brake, push radio button 1 two more times, etc.), verbal input of a code or command, or any other suitable means of providing some form of verification. The alternative input will be processed and validated 427 in a similar manner to the code, and new registration will then be permitted or prohibited. If no suitable verification means is present, the process may report an error 431 and exit.

Figure 5:
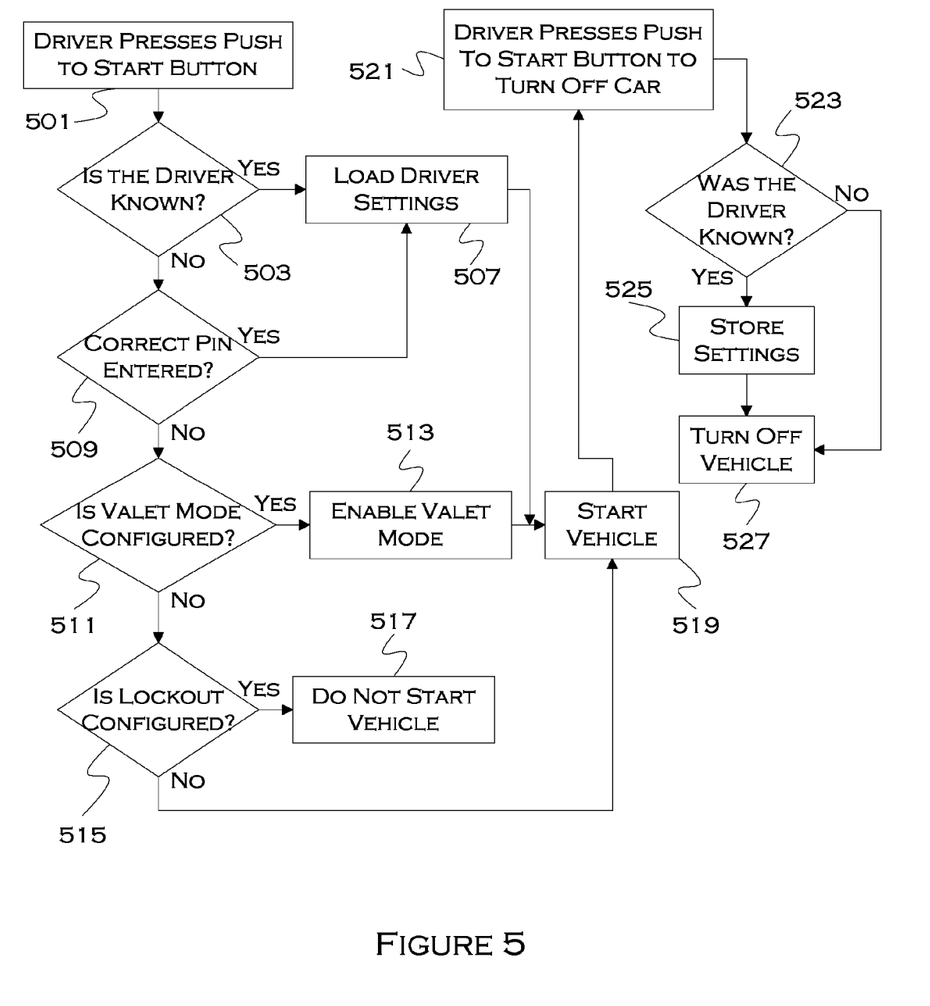
FIG. 5 shows a further example of a vehicle ignition process.

FIG. 5 shows a further example of a vehicle ignition process. In this illustrative example, the driver presses a PTS button equipped with a biometric fingerprint scanner 501. In other instances, the scanner may be located elsewhere within the vehicle, and the PTS button is pressed after a scan is taken or in conjunction with a scan. The fingerprint scan is processed for approval to start the vehicle.

If the scan processing results in a known driver 503, the process may load saved settings for that driver 507. These settings may be stored locally or remotely. If stored locally, the settings can be retrieved from local storage. The settings may also be stored on a paired phone associated with the driver, and once the driver is verified (thus identifying which phone in the vehicle is storing the settings) the settings could be retrieved. If stored in the cloud, the settings could be retrieved once a link to the cloud is established.

If the driver is unknown, an option to enter an approval personal identification number (PIN) may be provided. This number may correspond to a certain driver or be generally authorized for vehicle enablement. If the PIN corresponds to a certain driver, that driver's settings can be implemented as above 507. The PIN can be useful if the scanner is malfunctioning or if there is another reason why a correct fingerprint cannot be entered (e.g., the driver has a band-aid over an identification finger). The PIN can also be useful for loaning out a vehicle, and can be enabled for a limited time, if desired.

If no valid fingerprint or PIN is present, the process may check to see if a valet mode is configured 511. Valet mode will allow limited vehicle functionality for unknown drivers, permitting, for example, a valet to drive the vehicle short distances for parking and retrieval purposes. If the valet mode is configured, the process may enable the valet mode 513 and impose any restrictions associated therewith.

Finally, in this example, the process checks to see if lockout is configured 515. Lockout prohibits use of the vehicle if an authorized user is not present. If lockout is not configured, any user entering the vehicle may be permitted to start the vehicle, whether known or unknown. Lockout could be a persistent state, or, for example, could be automatically engaged when an alarm is triggered (preventing forced entry and vehicle start). If the user is not authorized and lockout is configured, the process will not start the vehicle 517.

Otherwise, if lockout is not configured, or when the user settings have been loaded or when the valet settings have been loaded, the vehicle will start 519. The vehicle can then be driven in accordance with the engaged mode.

If the lockout is not configured and an unauthorized user attempts to start the vehicle, a copy of the fingerprint scan may be saved to later identify that user if needed. Recordation of lockout mode may also take place, to record a time/GPS location, for example, to help catch any attempted theft. Other vehicle system, such as vehicle cameras, may also record data in this instance.

Upon reaching a destination, the user presses the button to power-down the vehicle 521. If the user was known to the vehicle 523, and thus has an associated profile, any setting changes made by the user may be saved to that profile at this time 525. The vehicle can then be powered down.

Through use of the illustrative embodiments, vehicles can have any number of authorized drivers and driver profiles stored. Information stored can include, but is not limited to, audio settings (source, volume, equalizer, etc.), climate settings (temperature, heated/cooled seats, lighting), preferred phone pairing orders, seat positions, configurable dash-board settings, navigation preferences (favorites, home, etc.), vehicle parameters, and any other suitable information.

Although a fingerprint was used as a biometric identifier in this example, other biometric identifiers may also be used to verify/authorize a driver. These can include, but are not limited to, voice recognition, face recognition, retinal scans and any other suitable form of biometric identifier. Some of these functions may be managed with existing vehicle hardware (e.g., voice recognition), while others may require additional biometric readers. As with the exemplary fingerprint case, biometric verification can be made prior to, or during, an ignition request.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a wireless transceiver configured to communicate with an off-board server; and
   a processor in communication with the wireless transceiver and further configured to:
   detect push-to-start (PTS) button engagement;
   receive an add-new-driver instruction and personal identification number (PIN);
   validate the PIN utilizing the off-board server;
   scan a finger positioned on a vehicle fingerprint scanner for a fingerprint following validation of the PIN;
   verify that the fingerprint corresponds to an authorized driver at the off-board server;
   request a vehicle setting from the off-board server associated with the authorized driver utilizing the fingerprint; and
   engage a vehicle ignition when the fingerprint corresponds to an authorized driver.

2. A system comprising:
a wireless transceiver configured to communicate with an off-board server;
a processor in communication with the wireless transceiver, the processor configured to:
receive an add-new-driver instruction;
receive an authorization format instruction corresponding to an authorization format for authorizing new driver addition;
receive input including a personal identification number (PIN) corresponding to the authorization format;
validate the PIN utilizing the off-board server;
following validation of the PIN, scan a finger positioned on a vehicle fingerprint scanner for a new driver fingerprint; and
add the new driver based on the new driver fingerprint, including saving the new driver fingerprint in a driver profile corresponding to the new driver.

3. The system of claim 2, wherein the authorization format includes verification of a master-driver fingerprint, wherein the master-driver fingerprint is associated with the new driver at time of vehicle purchase.

4. The system of claim 3, wherein the processor is configured to scan a finger positioned on a vehicle fingerprint scanner for a master driver fingerprint; and
validate the master driver fingerprint based on a stored master driver fingerprint located at the off-board server.

5. The system of claim 2, wherein the authorization format includes a verification code.

6. The system of claim 5, wherein the verification code is an alpha-numeric code input to a vehicle interface.

7. The system of claim 5, wherein the verification code includes a sequence of vehicle button interactions.

8. A system in a vehicle, comprising:
a processor configured to:
in response to an off-board server validating a personal identification number (PIN) entered at the vehicle, obtain a fingerprint scan utilizing a push-to-start button including a biometric sensor;
send the scan to the server for verification and to determine a vehicle setting associated with the scan;
receive the vehicle setting from the server;
engage a vehicle ignition if the fingerprint scan is verified.

9. The system of claim 8, wherein the biometric sensor is provided as part of the push-to-start button, such that depression of the button with a driver finger initiates scanning of the finger pressing the push-to-start button.

10. The system of claim 8, wherein the system further comprises a wireless transceiver configured to receive a secondary vehicle ignition engagement option from the off-board server, wherein the secondary vehicle ignition engagement option includes entry of the PIN.

11. The system of claim 10, wherein the PIN corresponds to a known driver for which a driver profile is stored.

12. The system of claim 10, wherein the PIN corresponds to an unknown driver.

13. The system of claim 1, wherein the processor is further configured to send the fingerprint to the off-board server to determine if the driver is an authorized driver.

14. The system of claim 13, wherein the vehicle setting received from the off-board server is associated with a master driver.

15. The system of claim 13, wherein the vehicle setting received from the off-board server is associated with another vehicle.

16. The system of claim 8, wherein the vehicle setting received from the off-board server is associated with a secondary vehicle ignition engagement option that is limited in number of uses.

17. The system of claim 8, wherein the vehicle setting received from the off-board server is associated with a secondary vehicle ignition engagement option that is limited in duration.

18. The system of claim 2, wherein the driver profile includes vehicle settings associated with the driver.

19. The system of claim 18, wherein the wireless transceiver is further configured to pair with a nomadic device; and
the vehicle settings are retrieved from the nomadic device paired with the wireless transceiver.

\* \* \* \* \*